United States Patent [19]

Macquart et al.

[11] Patent Number: 5,666,771
[45] Date of Patent: Sep. 16, 1997

[54] ELECTROCHROMIC GLAZING PANE

[75] Inventors: Philippe Macquart, Asnieres; Xavier Ripoche, Paris, both of France

[73] Assignee: Saint-Gobain Vitrage, Aubervilliers Cedex, France

[21] Appl. No.: 556,399

[22] Filed: Nov. 9, 1995

[51] Int. Cl.$^6$ ............................................. E04D 13/18
[52] U.S. Cl. ......................... 52/171.3; 52/172; 359/275; 359/591; 359/592; 359/260
[58] Field of Search ........................... 52/171.3, 172; 359/275, 260, 259, 261, 272, 591, 592, 54, 55, 92, 94, 96; 428/433

[56] References Cited

U.S. PATENT DOCUMENTS

| | | | |
|---|---|---|---|
| 4,180,954 | 1/1980 | Gell, Jr. ............................. | 52/171.3 |
| 4,390,246 | 6/1983 | Miyoshi . | |
| 4,447,133 | 5/1984 | Miyoshi . | |
| 4,463,071 | 7/1984 | Gifford et al. . | |
| 4,463,072 | 7/1984 | Gifford et al. . | |
| 4,522,901 | 6/1985 | Shacklette . | |
| 4,778,732 | 10/1988 | Hasegawa et al. ................ | 52/171.3 X |
| 5,042,923 | 8/1991 | Wolf et al. ........................ | 52/171.3 X |
| 5,197,242 | 3/1993 | Baughman et al. ................ | 52/171.3 |
| 5,518,594 | 5/1996 | Marcquart et al. . | |

OTHER PUBLICATIONS

Patent Abstracts Of Japan, vol. 4, No. 78(P-014)Jun. 6, 1980 & JP-A-55 043 575 (Seiko Instr & Electronics Ltd.) Mar. 27, 1980.

*Primary Examiner*—Wynn E. Wood
*Assistant Examiner*—W. Glenn Edwards
*Attorney, Agent, or Firm*—Oblon, Spivak, McClelland, Maier & Neustadt, P.C.

[57] ABSTRACT

This invention concerns an electrochromic pane comprising a principal functional film constituted of a material which, under the effect of an electric current, is capable of reversibly inserting cations and which has characteristics of coloration and/or transmission in certain wavelengths of electromagnetic radiation that differ for its inserted and deinserted states. Said principal functional film has a quasi-columnar structure, with axes of growth of the columns parallel to straight lines contained within a dihedron, the opening of which is less than 20°, and the bisector plane of which makes an acute angle with the substrate.

23 Claims, 1 Drawing Sheet

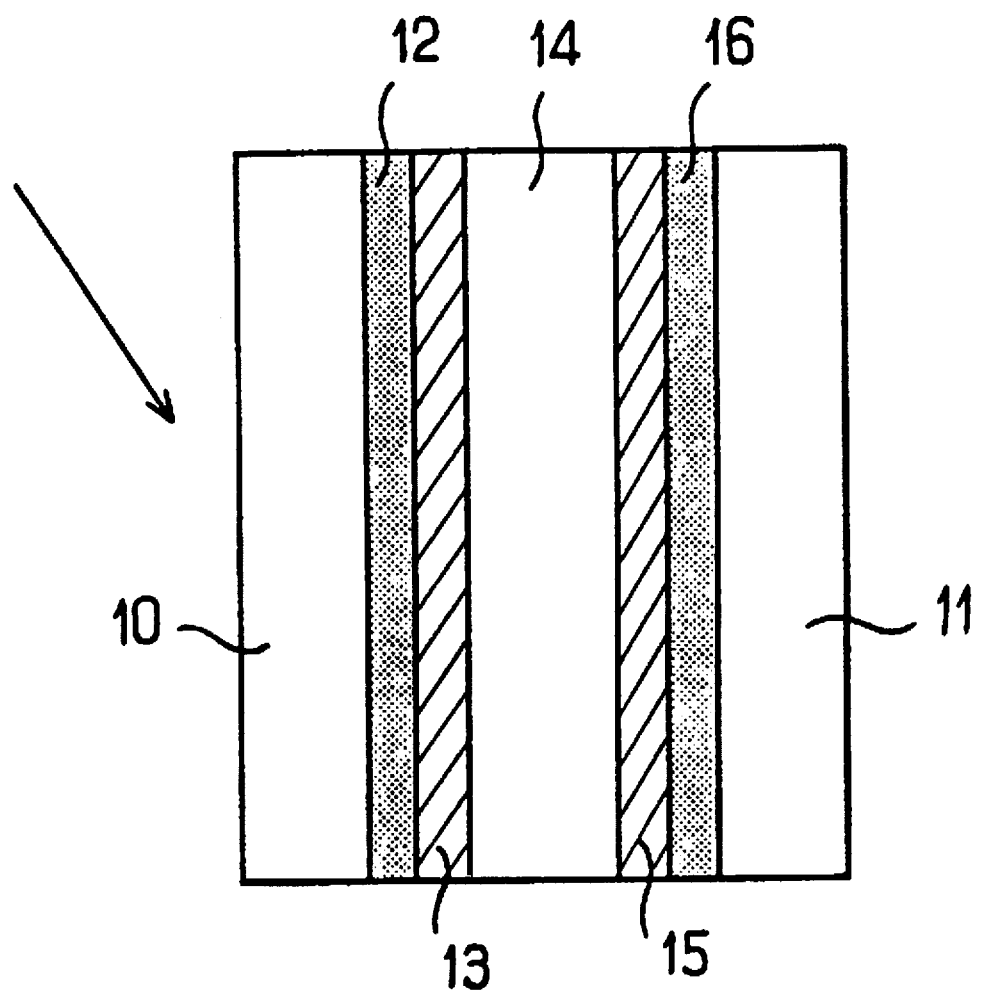
FIG_1

ELECTROCHROMIC GLAZING PANE

BACKGROUND OF THE INVENTION

1. Field of the Invention

This invention relates to electrically controlled panes, the coloration and/or transmission state of which in certain wavelengths of electromagnetic radiation, notably in the visible range, varies under the effect of an electrical current. More specifically, the invention concerns electrochromic panes based upon a film of a transition metal oxide capable of reversibly inserting cations, the oxidation states corresponding to the inserted and deinserted states having different properties of coloration and/or light transmission.

2. Discussion of the Background

Most commonly, electrochromic panes comprise, as principal functional film, a film of tungsten oxide $WO_3$, a cathodic electrochromic material, which is colorless when the tungsten is in its maximum oxidation state (+6) and dark blue for an oxidation state less than 5, for which the cation insertion reaction can be written:

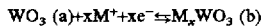

where $M^+=Li^+$, $H^+$ etc ...

For good reversibility of coloration, a cation source, itself preferably constituted of a film of electrochromic material, should be associated with the tungsten oxide film. The contrast is certainly reinforced if a coloration material known as anodic is used. Contrary to tungsten oxide, an anodic coloration material is colored in the deinserted state. Between the two films of electrochromic material there is interposed an electrolyte as a cation transfer means. Finally, the system should be completed by electron conducting films for the supply of electric current.

Electrochromic panes, sometimes termed intelligent panes, are particularly interesting for controlling the input of solar radiation in regions where the sunshine varies widely throughout the year. It is desirable to have available, at certain times, a very effective antisolar pane, which is accompanied by a very pronounced dark coloration and, at other times, a pane which in contrast is very clear, to allow good illumination by natural light.

However, electrochromic panes have isotropic optical properties for all directions of incidence of the radiation. Now in practice, all these directions are not equivalent: it is self-evident that the principal source of the energy radiation reaches the pane most often at a large angle of incidence, above the horizontal. In contrast, the view of the occupant of the building will most commonly be directed at an angle along the plane perpendicular to the pane or downwards. On the other hand, the reduction in the light transmission that accompanies any reduction in the energy transmission is usually considered as an unavoidable, but nevertheless unpleasant, defect of antisolar panes. From these aspects, it would be desirable for the pane to have a certain angular selectivity, that is to say for its optical performances to be strengthened according to the direction of incidence of the electromagnetic radiation.

French Patent Application FR-2 698 093, corresponding to EP-A-0 598 660 and U.S. Ser. No. 08/153,909, instructs about a pane, the transmission properties of which vary as a function of the incident light, produced by cathodic sputtering of a target of metal alloy—notably of the nickel-chromium or tantalum type, a guide channelling the particles emitted by the target to direct them obliquely onto the plane of the substrate. This method makes it possible to obtain, on an industrial scale, thin films having a structure which may be qualified as pseudo-columnar, the axes of growth of the crystals being parallel to straight lines contained within a dihedron of narrow opening (of small dihedral angle), the bisector plane of which makes an acute angle with the substrate.

This process makes possible the obtaining of panes having good optical selectivity as a function of the direction of observation. For all that, these panes still remain passive panes with fixed optical properties: the optical performances of these panes are optimized for quite precise sunshine conditions, which is far from being perfect for regions in which solar conditions continually vary.

The invention has as its objective an electrochromic pane which, in one of its coloration states, has a strong anisotropy of its transmission characteristics for electromagnetic radiation.

SUMMARY OF THE INVENTION

The invention thus concerns an electrochromic pane comprising a principal functional film constituted of a material which, under the effect of an electric current, is capable of reversibly inserting cations and which has coloration and/or transmission characteristics in certain wavelengths of electromagnetic radiation that differ for its inserted and deinserted states. This is achieved by the fact that the principal functional film has a quasi-columnar structure and that the axes of growth of crystals of the principal electrochromic film are parallel to straight lines contained within a dihedron, the dihedral angle of which is less than 20° and the bisector plane of which makes an acute angle with the substrate, preferably less than 40° and more preferably lying between 10° and 30°.

The authors of the present invention have found that the columnar (or quasi-columnar) structure of the electrochromic film does not modify its capacities for reversible insertion of cations. Indeed, it appears that this structure is rather favorable. The electrochromism phenomenon is preserved, but in contrast, the optical performances of the pane—in its colored state, are anisotropic.

For further improving the angular selectivity of the pane according to the invention, the counter-electrode—insofar as it is also constituted of a film of an electrochromic material—is preferably likewise a film having a columnar structure deposited in conditions such that the axes of crystal growth of the principal functional film are parallel to straight lines contained within a dihedron having a dihedral angle of less than 20° and the bisector plane of which makes an acute angle with the substrate.

BRIEF DESCRIPTION OF THE DRAWINGS

Other characteristics and particular advantages of the invention will be apparent from the description given below of various examples of embodiment of the invention, prepared with reference to the attached drawings, which show:

FIG. 1: a schematic view of an electrochromic pane with angular selectivity.

DETAILED DESCRIPTION OF THE PREFERRED EMBODIMENTS

In a first embodiment, the substrate carrying the two electrochromic films, opposite to each other, should be disposed in such a manner that the axes of growth of the two electrochromic films are essentially parallel: this is the case in which the two electrochromic materials and the electrolyte material which separates them have refractive indices that are very close together or indeed are identical.

In a second embodiment, the axes of growth of the two films of electrochromic material remain in the same general direction, but are no longer entirely parallel: this is notably the case in which differences of refractive index exist between the first cathodic electrochromic film, the electrolyte and the counter-electrode. This non-parallelism is then preferably adjusted in such a way as to "compensate" the deviation of the light beam or electromagnetic beam passing through the three materials of different indices, the choice of the angle of the growth axes of the counter-electrode then being made by a simple calculation using the well known Descartes law.

In contrast, the other films of the pane—in particular the transparent electron conducting films and the barrier films, if present, placed for example between the electrolyte and one or the other of the films of electrochromic material, are advantageously isotropic films, or at least films having essentially isotropic optical properties depending upon the direction of incidence of the electromagnetic radiation. In these conditions, in the decolored state, the pane does not exhibit any angular selectively, the anisotropy of the optical properties being due essentially to a lesser absorption of the radiation when the latter has an incidence parallel to or close to the axis of growth of the colored crystals. This total absence of angular selectively in the decolored state is advantageous, particularly in winter, in order to draw the maximum benefit from the natural light.

In another embodiment, at least some of the other films of the pane are films having a quasi-columnar structure, possessing anisotropic optical properties according to the direction of incidence of the pane. In this case, the angular selectivity is also present in the decolored state, but to a lesser degree.

The best results are observed when the length of the columns is of the same order of magnitude as the wavelength of the radiation for which the maximum selectivity is desired. If the orientation dihedron of the crystals allows a bisector plane at 30° to the plane of the substrate, the length of the columns will be close to twice the thickness of the film: for an absorption in the red and the near infrared, it is for this reason advantageous to use electrochromic films, the thickness of which is typically in the vicinity of 300 to 500 nm, a range of thicknesses which is well suited for the construction of electrochromic systems in which the principal functional film is based upon tungsten oxide.

The technique used is non-reactive or reactive cathodic sputtering. Preferably, cathodes with "magnetron" are used, that is to say in which the procedure is assisted by magnetic field, which enables the sputtering rate to be increased. A suitable technique is described in U.S. Pat. No. 5,518,594 (FR 2,698,093 and EP-A-598,660)

FIG. 1 of U.S. Pat. No. 5,518,594 shows a horizontal section through the test installation. This is a conventional cathodic sputtering installation using a magnetron of the type of that described in Patent DE 24 63 431 C2. This magnetron 1 is situated vertically in a vacuum enclosure, not illustrated in the Figure, that is to say the longitudinal axis of symmetry 9 of the "race track" target is vertical. Gases such as argon or reactive gases can be introduced. The magnetron cathode 1 is equipped with a target 2, preferably a metallic target. In FIG. 1, zones of maximum erosion of the target 2 can be seen at 3, where the sputtering is performed essentially, and between these zones is the axis 9. The installation is provided with a specimen support, not shown, which makes possible a horizontal displacement of the vertical specimen 4 in its plane in the direction of arrow 5.

Parallel to the specimen 4, between it and the cathode 1, a guide 6 has been placed. This is composed of an assembly of mutually parallel vertical plane plates 7, these plates 7 being connected together by means of a frame 8, which enables the whole assembly to be fixed. The plates 7 are spaced apart by 10 mm. The material of the guide 6 is advantageously stainless steel. The assembly is fixed with respect to the cathode 1 and substantially parallel to the plane specimen 4 at approximately 10 mm from it.

This test device allows the particles emitted from the target to strike the specimen along trajectories situated in planes making an angle $\alpha$, of between 5° and 40°, with the surface of the specimen.

The particles arrive at a point of the substrate at low angles of incidence, in planes which make, with the surface of the specimen, an angle $\alpha$ preferably chosen in the region of 30°.

This device was used on a substrate of float glass of 3 mm thickness, coated with a transparent electrically conducting film of indium oxide doped with tin, itself deposited by magnetron cathodic sputtering, without a guide placed between the specimen and the cathode. The thickness of the ITO film is 400 nm, its square resistance being 5 ohms. The target of the magnetron is of metallic tungsten, and the gas is an argon/oxygen mixture.

The film of tungsten oxide was deposited to a thickness of 100 nm; the wave guide being such that the angle $\alpha$ between the straight line carrying a growth axis of the crystals and the plane of the substrate is 30°, with a dispersion (dihedral opening angle) of 10°.

The electrochromic character of the quasi-columnar tungsten oxide film thus obtained was tested in a lithium medium and in a protic medium. For this purpose, the substrate is placed in an electrolyte bath coated with the film of $WO_3$ and with a platinum counter-electrode, placed in a liquid bath containing either a lithium salt (in the present case) or an acid such as, for example, sulfuric acid. A potential difference is established between the platinum counter-electrode and the electron conducting film beneath the film of $WO_3$ for the purpose of inserting (or deinserting) cations in the electrochromic film.

Light transmission measurements were performed by comparing the transmission under an incidence of +60° or −60° relative to the perpendicular to the plane of the substrate. A first measurement was taken for an incidence essentially parallel to the growth axis of the crystals, which corresponds essentially to the direction of viewing of an observer who wishes to see the spectacle in the street, and a second measurement is taken at the complementary angle, which corresponds basically to the principal direction of the solar radiation, notably in summer in temperate regions.

For the first system (the lithium route), the following results were obtained, the light transmission values having been measured with illuminant $D_{65}$:

TABLE 1

| Angle of incidence relative to the perpendicular | +60° | −60° |
|---|---|---|
| Light transmission in decolored state | 85% | 85% |
| Light transmission in colored state | 45% | 38.5% |
| Contrast | 1.88 | 2.2 |

For the second system (proton route), the following results were obtained:

TABLE 2

| Angle of incidence relative to the perpendicular | +60° | −60° |
|---|---|---|
| Light transmission in decolored state | 85% | 85% |
| Light transmission in colored state | 48% | 42% |
| Contrast | 1.77 | 2.03 |

The two systems exhibit, for the colored state, a relative difference of the order of 15% depending upon the direction of incidence. In contrast, in the decolored state, no anisotropy can be observed.

It should be noted that the film of $WO_3$ chosen for this test had a relatively small thickness, which explains why the measured contrast is relatively low. For greater thicknesses, the contrast is certainly much larger, and furthermore an increase in the angular selectivity is advantageously observed, with a much more pronounced difference between the contrasts.

Such a film of electrochromic material may be used for the construction of a complete electrochromic pane such as that shown diagrammatically in FIG. 2. Such a pane comprises two glass substrates 10, 11, separated by a transparent electrically conducting film 12, the film of $WO_3$ with essentially columnar structure 13, an ion conducting electrolyte 14, a counter-electrode formed of an electrochromic material termed anodic 15 and a second transparent electrically conducting film 16. Electrical means, not illustrated here, are provided for establishing an electrical current between two diametrically opposite terminals situated, the one in contact with the electron conducting film 12, the other with the film 16.

If desired, the system may also contain other films, notably those known as "barrier films", at the interfaces between the electron conducting films and the films of electrochromic material, and/or at the interfaces between electrolyte and electrochromic material. Preferably, all the films of non-electrochromic material are deposited by conventional techniques which lead to films that are essentially isotropic considered from the aspect of their optical properties.

Any electrolyte material conventionally known in the area of electrochromic films may be used. The electrolyte is preferably a polymer-salt or polymer-acid solid complex. Details on the manner of construction of such a system, and in particular examples of assembly and electrical supply of such systems, will be found notably in EP-408 427, EP-475 847, EP-477 065 and EP-486 387.

As FIG. 2 shows, when the two films of electrochromic material are of quasi-columnar growth, it is necessary to ensure that the panels are oriented in such a way that the crystals of the two films are carried by essentially parallel axes. Furthermore, in the mounting of the pane, it is necessary to ensure that the top and bottom of the panel are not reversed, since the axes of growth of the crystals must be orientated with an angle opposite to the principal incidence of the radiation that it is desired to modulate (the arrow "f" schematically indicating in this case the solar radiation).

The thickness of the film of electrochromic material—and more especially of the tungsten oxide film—is preferably of the order of 300–500 nm, which corresponds to a maximum selectivity for wavelengths lying between 600 and 1,000 nanometres.

For systems based upon the reversible insertion of lithium cations, there is used, for example, a counter-electrode of nickel oxide NiO, deposited by magnetron cathodic sputtering from a target of metallic nickel, in the presence of an argon/oxygen gaseous mixture. The glass plate, coated with the nickel oxide film deposited on the ITO, is placed in an electrolyte containing a lithium salt and is electrochemically prepared for the preinsertion therein of the $Li^+$ ions.

For such systems using lithium, the electrolyte interposed between the films of electrochromic material is, for example, an ion conducting polymer formed, notably, of a solid complex of polyoxyethylene-lithium salt.

For protic systems, the electrolyte is, for example, a solid solution of anhydrous phosphoric acid in polyoxyethylene, for example, with a thickness of 80 micrometers. The counter-electrode is, for example, a counter-electrode based upon iridium oxide, deposited by cathodic sputtering assisted by magnetic field, in the presence of an oxygen/hydrogen gaseous mixture. The thickness of the film is from 50 to 200 nm for a tungsten oxide film of approximately 400 nm. For the counter-electrode, the guide that orientates the growth of the crystals is not indispensable, but nevertheless it is preferable to use one also for the counter-electrode, even if the latter makes a weaker contribution to the value of the contrast.

The invention may thus be applied to numerous configurations of electrochromic panes, functioning equally well by protic conduction or by conduction of lithium ions $Li^+$.

The film termed principal functional film in the film of this invention corresponds, for example, to a cathodic electrochromic material of the tungsten oxide type, whether the cations are protons or lithium ions.

The counter-electrode corresponds, for example, to an anodic electrochromic material, notably based upon iridium oxide of the type $H_xIrO_y$, as described in EP-0 338 876, or based upon nickel oxide $H_xNiO_y$, when the cations are protons. If the cations are lithium ions, it may be based upon nickel oxide of the $Li_xNiO_y$ type, as described in EP-0 373 020, or based upon cerium oxide, as described in FR-2,633, 609.

When the cations are protons, the electrolyte which transfers the protons between the functional film and the counter-electrode is a proton conductor, which may be of a polymeric nature, such as a solid solution of phosphoric acid in polyoxyethylene, as described in EP-0 253 713, possibly with the addition of additives of the antioxidizing and/or thixotropic agent type, as described in EP-A-0 670 346. The electrolyte may also be mineral, such as hydrated tantalum oxide $H_xTa_2O_y$, hydrated antimony oxide $H_xSb_2O_y$ or hydrated niobium oxide $H_xNb_2O_y$.

When the cations are lithium ions, this electrolyte may be a polymeric $Li^+$ conductor, such as a solution of branched polyoxyethylene imine (BPEI), possibly with the addition of a plasticizer, and of a lithium salt, as described in EP-0 518 754. The electrolyte may also be mineral, such as lithiated tantalum oxide $Li_xTa_2O_y$, lithiated magnesium fluoride $Li_xMgF_2$, lithium nitride $Li_3N$ or a lithium aluminosilicate.

The usual stack sequence of an electrochromic pane therefore comprises, as recalled above, a first transparent substrate of the glass type, a first electrically conducting film (for example of $SnO_2$:F or of ITO), the functional film of electrochromic material, the electrolyte, the counter-electrode also of electrochromic material, a second electrically conducting film and, finally, a second transparent substrate of the glass type. It may, however, be advantageous to insert films terms "barrier" films into this stack for various reasons: There may thus be provided, between the electrically conducting films and at least one of the films of electrochromic material, barrier films, notably of highdensity tin oxide or tungsten oxide. For further details, reference may be made to EP-0 486 387.

Barrier films may also be interposed between the electrolyte and the counter-electrode, and possibly also between the electrolyte and the functional film. These films must be open to the diffusion of the $M^+$ cations and, notably, be based upon at least one of the following materials: oxides of column V-B of the periodic table, including more particularly tantalum oxide and niobium oxide, but also cerium fluoride $CeF_3$, antimony oxide $Sb_2O_3$, hexa-uranylphosphate HUP, chromium oxide $Cr_2O_3$, zirconium oxide $ZrO_2$, or by an ion conductor of the type $Li_3N$, $LiTaO_3$, $LiAlF_4$, $Li_3PO_4$, $LiBO_2$ or $LiNbO_3$, more especially in the case where $M^+=Li^+$. For further details reference may be made to EP-0 628 849.

As recalled earlier, the electrically conducting films and/or the barrier films may be isotropic or anisotropic with regard to their optical properties.

Obviously, numerous modifications and variations of the present invention are possible in light of the above teachings. It is therefore to be understood that within the scope of the appended claims, the invention may be practiced otherwise than as specifically described herein.

This application is based on French patent application FR 94/05947, filed in the French Patent Office on May 16, 1994, the entire contents of which are hereby incorporated by reference.

What is claimed as new and desired to be secured by Letters Patent of the United States is:

1. An electrochromic pane comprising:
   (i) a principle functional film comprising a material capable of reversibly inserting cations under the effect of an electric current and has different coloration for its inserted and deinserted states;
   (ii) a counter-electrode comprising a material capable of reversibly inserting cations under the effect of an electric current; and
   (iii) a substrate;
   wherein said principle functional film has a structure with growth axes of columns parallel to straight lines contained in a dihedron, the opening of said dihedron is less than 20°, and the bisector plain of said dihedron makes an acute angle of less than 40° with said substrate, and
   said pane, in at least its colored state, has anisotropic optical performances.

2. The electrochromic pane of claim 1, wherein said counter-electrode has a structure with growth axes of columns parallel to straight lines contained in a second dihedron, the opening of said second dihedron is less than 20°, and orientated in said pane, and which are either essentially parallel to growth axes of said principal functional film, or in the same general direction but not entirely parallel, notably for the purpose of taking into account possible differences of refractive index between the principal functional film, counter-electrode and electrolyte.

3. The electrochromic pane of claim 1, wherein said pane further comprises at least one film, not comprising electrochromic material, having isotropic optical properties.

4. The electrochromic pane of claim 1, wherein said pane further comprises at least one film, not comprising electrochromic material, having anisotropic optical properties.

5. The electrochromic pane of claim 1, wherein a thickness of said principal functional film is of the order of one-half of a wavelength of radiation for which the maximum selectivity is desired.

6. The electrochromic pane of claim 1, wherein said principal functional film comprises tungsten oxide.

7. The electrochromic pane of claim 1, wherein said cations of said principal functional film are $H^+$ or $Li^+$.

8. The electrochromic pane of claim 7, wherein said counter-electrode comprises iridium oxide of the type $H_xIrO_y$, or nickel oxide of the type $H_xNiO_y$, and said cations are $H^+$.

9. The electrochromic pane of claim 7, wherein said counter-electrode comprises nickel oxide of the type $Li_xNiO_y$ or cerium oxide of the type $Li_xCeO_y$, and said cations are $Li^+$.

10. The electrochromic pane of claim 7, wherein said cations are $H^+$, said pane further comprises an electrolyte, between said functional film and said counter-electrode, comprising a polymeric proton conducting material or a mineral proton conducting material.

11. The electrochromic pane of claim 10, wherein said electrolyte comprises said polymeric proton conducting material, and said polymeric proton conducting material is a solid solution of phosphoric acid in polyoxyethylene.

12. The electrochromic pane of claim 11, wherein said electrolyte further comprises one member selected from the group consisting of an antioxidizing agent, a thixotropic agent and a mixture thereof.

13. The electrochromic pane of claim 10, wherein said electrolyte comprises said mineral proton conducting material, and said mineral proton conducting material is selected from the group consisting of hydrated tantalum oxide, hydrated antimony oxide, hydrated niobium oxide and a mixture thereof.

14. The electrochromic pane of claim 7, wherein said cations are $Li^+$, said pane further comprises an electrolyte, between said functional film and said counter-electrode, comprising a polymeric $Li^+$ conductor.

15. The electrochromic pane of claim 14, wherein said polymeric $Li^+$ conductor is selected from the group consisting of a solution of branched polyoxyethylene imine, an $Li^+$ salt, and a mineral $Li^+$ conductor.

16. The electrochromic pane of claim 14, wherein said electrolyte further comprises a plasticizer.

17. The electrochromic pane of claim 15, wherein said electrolyte comprises said mineral $Li^+$ conductor, and said mineral $Li^+$ conductor is selected from the group consisting of lithiated tantalum oxide, lithiated magnesium fluoride, lithium nitride, a lithium aluminosilicate and a mixture thereof.

18. The electrochromic pane of claim 1, further comprising an electrolyte, between said functional film and said counter-electrode, and
   interposed between said electrolyte and said counter-electrode, a barrier film open to diffusion of said cations and comprising at least one member selected from the group consisting of an oxide of column VB of the periodic table, cerium fluoride, antimony oxide, hexa-uranylphosphate, chromium oxide, zirconium oxide and an ion conductor.

19. The electrochromic pane of claim 18, wherein said barrier film comprises one member selected from the group consisting of tantalum oxide and niobium oxide.

20. The electrochromic pane of claim 18, wherein said barrier film comprises an ion conductor, and said ion conductor is selected from the group consisting of $Li_3N$, $LiTaO_3$, $LiAlF_4$, $Li_3PO_4$, $LiBo_2$ and $LiNbO_3$.

21. The electrochromic pane of claim 20, wherein said cations are $Li^+$.

22. The electrochromic pane of claim 1, further comprising an electrolyte, between said functional film and said counter-electrode, and interposed between said electrolyte and said functional film, a barrier film open to diffusion of said cations and comprising at least one member selected from the group consisting of an oxide of column VB of the periodic table, cerium fluoride, antimony oxide, hexauranylphosphate, chromium oxide, zirconium oxide and an ion conductor.

23. An electrochromic pane comprising:

(i) a principle functional film comprising a material capable of reversibly inserting cations under the effect of an electric current and has different coloration for its inserted and deinserted states;

(ii) a counter-electrode comprising a material capable of reversibly inserting cations under the effect of an electric current;

(iii) a substrate;

(iv) a first transparent electrically conducting film; and (v) a second transparent electrically conducting film;

wherein said principle functional film has a structure with growth axes of columns parallel to straight lines contained in a dihedron, the opening of said dihedron is less than 20°, and the bisector plain of said dihedron makes an acute angle of less than 40° with said substrate, said pane, in at least its colored state, has anisotropic optical performances, and wherein said principle functional film and said counter-electrode are between said first and second transparent electrically conducting films.

* * * * *